US 6,915,296 B2

(12) United States Patent
Parson

(10) Patent No.: US 6,915,296 B2
(45) Date of Patent: Jul. 5, 2005

(54) INCREMENTAL REORGANIZATION FOR HASH TABLES

(75) Inventor: Dale E. Parson, Fleetwood, PA (US)

(73) Assignee: Agere Systems Inc., Allentown, PA (US)

(*) Notice: Subject to any disclaimer, the term of this patent is extended or adjusted under 35 U.S.C. 154(b) by 80 days.

(21) Appl. No.: 10/282,464

(22) Filed: Oct. 29, 2002

(65) Prior Publication Data

US 2004/0083347 A1 Apr. 29, 2004

(51) Int. Cl.[7] .................................................. G06F 7/00
(52) U.S. Cl. ............................................. 707/4; 700/90
(58) Field of Search ............................. 700/90; 707/4, 707/1, 100, 101; 711/133, 159, 216; 370/395.31, 395.32

(56) References Cited

U.S. PATENT DOCUMENTS

| | | | | |
|---|---|---|---|---|
| 4,996,663 A | * | 2/1991 | Nemes | 707/200 |
| 5,371,499 A | * | 12/1994 | Graybill et al. | 341/51 |
| 5,555,405 A | * | 9/1996 | Griesmer et al. | 707/205 |
| 5,701,432 A | * | 12/1997 | Wong et al. | 711/130 |
| 6,018,526 A | * | 1/2000 | Liu et al. | 370/401 |
| 6,067,547 A | * | 5/2000 | Douceur | 707/100 |
| 6,115,802 A | * | 9/2000 | Tock et al. | 711/216 |
| 6,134,546 A | * | 10/2000 | Bestgen et al. | 707/4 |
| 6,201,755 B1 | * | 3/2001 | Pillar et al. | 365/230.01 |
| 6,418,422 B1 | * | 7/2002 | Guenther et al. | 705/401 |
| 6,567,817 B1 | * | 5/2003 | VanLeer | 707/102 |

OTHER PUBLICATIONS

B. Carlson, "Packets Challenge Next–Gen Nets," EETimes, downloaded from http://www.eetimes.com/story/OEG20020802S0033 (Aug. 2002).
Friedman et al., "Hashtables for Embedded and Real–Time Systems," IEEE Real–Time Embedded System Workshop (Dec. 2001).
Szymanski, T.G., "Hash Table Reorganization," Journal of Algorithms, 6(3), 322–335 (1985).

* cited by examiner

*Primary Examiner*—Leo Picard
*Assistant Examiner*—Carlos Ortiz Rodriguez

(57) ABSTRACT

Incremental reorganization of hash tables includes a copy phase and a clean phase. In the copy phase, used entries from an alternate hash table (AHT) are copied to a current hash table (CHT). During copying, hash table operations are allowed to access both tables. In the clean phase, entries in the AHT are marked as empty, and hash table operations are allowed to access only the CHT. Once all used entries have been copied from the AHT to the CHT, the clean phase begins. Once all entries in the AHT have been marked as empty during the clean phase, the two tables are switched and the copy phase begins. The copying or cleaning occurs with every hash table operation, a number of hash table operations, or a number based on analysis of recent hash table operations. Copying also occurs by avoiding copying of deleted or expired entries in the AHT. The present invention is suited to use in multithreaded real-time systems.

24 Claims, 7 Drawing Sheets

FIG. 3 ⟋300

| INITIALLY EMPTY HASH TABLE |||
|---|---|---|
| INDEX | KEY | ENTRY STATUS |
| 00 | | EMPTY |
| 01 | | EMPTY |
| 02 | | EMPTY |
| 03 | | EMPTY |
| 04 | | EMPTY |
| 05 | | EMPTY |
| 06 | | EMPTY |
| 07 | | EMPTY |
| 08 | | EMPTY |
| 09 | | EMPTY |

FIG. 4 ⟋400

| HASH TABLE AFTER KEYS 110, 210, 119, 5, 99 |||
|---|---|---|
| INDEX | KEY | ENTRY STATUS |
| 00 | 5 | USED |
| 01 | 110 | USED |
| 02 | 210 | USED |
| 03 | 119 | USED |
| 04 | 99 | USED |
| 05 | | EMPTY |
| 06 | | EMPTY |
| 07 | | EMPTY |
| 08 | | EMPTY |
| 09 | | EMPTY |

FIG. 5

HASH TABLE AFTER KEY 210 IS DELETED

| INDEX | KEY | ENTRY STATUS |
|---|---|---|
| 00 | 5 | USED |
| 01 | 110 | USED |
| 02 | FORMERLY 210 | DELETED |
| 03 | 119 | USED |
| 04 | 99 | USED |
| 05 | | EMPTY |
| 06 | | EMPTY |
| 07 | | EMPTY |
| 08 | | EMPTY |
| 09 | | EMPTY |

FIG. 6

HASH TABLE AFTER ADDITIONAL DELETIONS

| INDEX | KEY | ENTRY STATUS |
|---|---|---|
| 00 | FORMERLY 5 | DELETED |
| 01 | FORMERLY 110 | DELETED |
| 02 | FORMERLY 210 | DELETED |
| 03 | FORMERLY 119 | DELETED |
| 04 | 99 | USED |
| 05 | | EMPTY |
| 06 | | EMPTY |
| 07 | | EMPTY |
| 08 | | EMPTY |
| 09 | | EMPTY |

FIG. 9

| PHASE | GET OPERATION | PUT OPERATION | REMOVE OPERATION |
|---|---|---|---|
| COPY PHASE | RETRIEVE FROM EITHER TABLE. | RETRIEVE FROM EITHER TABLE, INSERT INTO CURRENT TABLE IF NOT FOUND. | DELETE FROM BOTH TABLES. |
| | TABLE REORGANIZER WALKS THROUGH ALTERNATE TABLE, A STEP AT A TIME, COPYING USED ENTRIES INTO THE CURRENT TABLE VIA HASHING. WHEN IT REACHES ALTERNATE'S END, IT CHANGES TO THE CLEAN PHASE. | | |
| CLEAN PHASE | RETRIEVE FROM CURRENT TABLE. | RETRIEVE FROM CURRENT TABLE, INSERT INTO CURRENT TABLE IF NOT FOUND. | DELETE FROM CURRENT TABLE. |
| | TABLE REORGANIZER WALKS THROUGH ALTERNATE TABLE, A STEP AT A TIME, CONVERTING ALL ENTRIES TO EMPTY. WHEN IT REACHES ALTERNATE'S END, IT CHANGES TO THE COPY PHASE, AND REVERSES THE ROLES OF THE TABLES. THE NEW CURRENT TABLE IS EMPTY; COPYING BEGINS FROM THE POPULATED ALTERNATE TABLE. | | |

INCREMENTAL REORGANIZATION FOR HASH TABLES

FIELD OF THE INVENTION

The present invention relates generally to data structures, and more particularly to hash tables.

BACKGROUND OF THE INVENTION

There are many real-time processors that associate incoming data with outgoing data. One example is a network processor. A network processor receives incoming packets, each of which may have a relationship with one or more packets that previously passed through the network processor. The network processor attempts to match a current packet with information from packets that have previously passed through the network processor. As an example, in network address translation (NAT), a network processor requires a way to store information (commonly called "state") contained in one packet for matching against subsequent packets. State storage, retrieval, update, and deletion, each of which is based on a "key" associated with a packet, must generally operate within tight time constraints.

Content addressable memory (CAM) is a memory type that allows key-oriented information to be stored and quickly retrieved. CAM performs parallel searches on entries in the CAM. In other words, a network processor could order a search for "Key a" in a CAM, every entry in the CAM would compare its contents with "Key a," and every entry that contained "Key a" would be quickly found and marked. Typically, in NAT, there is either one entry or no entries that contain the key.

CAM, however, is very expensive. Not only is a comparator used for every entry, but each entry generally contains a substantial amount of information. For instance, each entry could contain a 64-bit key and associated data, or a reference to a location in cheaper memory, such as dynamic random access memory (DRAM) or static random access memory (SRAM), where the associated data is stored. The reference can contain a relatively high number of bits, meaning that each CAM entry can be relatively large, such as 128 bits or more. The combination of a large memory with individual comparators for each entry causes CAM to be expensive.

There are also data structures implemented in cheaper memory that are suitable for accessing key-oriented information. One such data structure is a hash table. A hash function is used to access a hash table. Broadly, a hash function accepts an input key and selects an entry in the hash table based on the key. If no entry is found, the key and associated data are added to the hash table. If an entry becomes untimely or is no longer used, the entry is deleted.

These operations on hash tables mean that hash tables become harder to manage with the passage of time, particularly for a processor that needs to retrieve keys and associated data within tight time constraints. As hash tables have more entries and deletions, it generally takes longer, on average, to retrieve a key and its associated data. As described in more detail below, deletions for many types of hash tables do not decrease the time it takes to retrieve a key.

Moreover, certain types of hash tables are not particularly suitable for processors that support multithreading. During multithreading, multiple threads can contest for the same memory. Certain types of hash tables require a portion of memory that needs to be locked by a thread during operations such as adding a key and its associated data to the hash table. When this memory portion is locked, no other thread has access to the memory portion and, consequently, cannot add a key or its associated data to the hash table. This leads to unacceptable delays in many real-time processors.

A need therefore exists for techniques that speed accesses to hash tables, allow relatively cheap memory to be used for hash tables, and allow multiple threads to access a hash table with relatively low delay.

SUMMARY OF THE INVENTION

The present invention provides techniques for incrementally reorganizing hash tables. The incremental reorganization is performed with minimal impact on a real-time system. These techniques are also suitable to allow multiple threads to access a hash table in a reasonable time.

In one aspect of the invention, two hash tables are maintained, a current and an alternate hash table. In a copy phase, used entries from the alternate hash table are copied to the current hash table. During copying, requests for hash table operations are allowed to access both the current hash table and the alternate hash table. Generally, new entries are added only to the current hash table. In a cleaning phase, entries in the alternate hash table are marked as empty, and requests for hash table operations are allowed to access only the current hash table. Generally, once all entries have been copied from the alternate hash table to the current hash table as part of the copy phase, the clean phase is entered. Once all the entries have been marked as empty in the alternate hash table as part of the clean phase, the two tables are switched, such that the current hash table is the former alternate hash table and the alternate hash table is the former current hash table. After switching, the copy phase is entered.

In other aspects of the invention, the copying or cleaning occur with every request for a hash table operation, a predetermined number of requests for a hash table operation, or a number of requests for a hash table operation that is determined based on analysis of recent hash table operations.

In another aspect of the invention, copying does not copy expired entries from the alternate hash table to the current hash table, where an expired entry is generally an entry that has not been accessed in a predetermined time period.

In yet another aspect of the invention, the incremental reorganization techniques of the present invention are applied to multithreaded real-time systems.

BRIEF DESCRIPTION OF THE DRAWINGS

FIGS. 3 through 6 are examples of an open hash table, illustrating a second technique for dealing with collisions and how deletions and insertions increase access times to a hash table;

FIG. 9 is a table showing how operations are affected by different phases of incremental reorganization of hash table, in accordance with a preferred embodiment of the present invention.

DETAILED DESCRIPTION

For ease of reference, this disclosure is divided into the following sections: (I) Introduction; (II) Exemplary System and Method; (III) Additional Examples; and (IV) Multithreading Examples.

I. Introduction

As described above, a hash table uses a hash function to map a key selected from a large range of possible key values (e.g., an Internet Protocol address from a range of available addresses) to an integer index into the hash table, where the index indicates the desired location in the table at which to store the key and any associated data. The number of possible keys is vastly larger than the size of the table, but a realistic application of a hash table will use only some fraction of the available table locations to store keys and their associated data. For example, to index a four-digit key in the range 0000–9999 to a two-digit index in the range 00–99 for a 100-entry hash table, a classic hash function multiplies the left two digits of the key by the right two digits of the key to form a four-digit product, from which the hash function takes the middle two digits as the hash index. The key 4567, for example, yields a product 45×67=3015, with the middle digits giving a hash index of 01 for this hash function. The goal of a good hash function is to distribute indices for keys across the table. The subject of effective hashing functions is outside the scope of the present disclosure.

Regardless of effectiveness in scattering key indices, every hash function has the certainty of mapping more than one key to a single hash table index when the number of keys exceeds the number of indices. This condition is known as a "collision." In a collision, a key maps to a table index that is already occupied by a different key and its data.

Figure 1:
FIG. 1 is an example of a hash table, illustrating common accesses to a hash table, including a collision.

Both a normal access and a collision are shown in FIG. 1, which has a block diagram of an exemplary hash table 100. Hash table 100 has, for purposes of example, two used entries 110 and 120. A hash function accepts key "a" and produces an output of 1, illustrated by "h(a)=1" in FIG. 1. A processor using the hash function can then access entry 110 and retrieve key a and its associated data. It should be noted that the associated data is, in some implementations, a reference to an external memory location containing the associated data for key a.

A collision is also shown in FIG. 1, because a hash function performed on key b or on key c returns an index of 3. Because the index is the same for two different keys, it is unclear as to what should be placed into entry 120.

Figure 2:
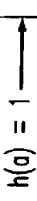
FIG. 2 is an example of a chained hash table, illustrating a common technique for dealing with collisions.

There are several techniques for dealing with collisions. One such technique, called a chained hash table, is shown in FIG. 2. Chained hash table 200 is hash table 100 but with slightly different entries 210 and 220 where entries 110 and 120, respectively, are in hash table 100. Entry 210 comprises a reference, "NULL PTR." This reference indicates that there are no other keys associated with the entry 210. In this example, there are three keys that map to the same index, index 3. Chained hash table 200 fixes the collision caused by this mapping by adding references to additional keys. For example, entry 220 contains a reference "PTR TO c," which allows a processor to access entry 230. Similarly, entry 230 contains a reference "PTR TO d," which allows a processor to access entry 240. Entry 240 contains a "NULL PTR" reference, which indicates that entry 240 is the end "link" in a "chain" created by entries 220 through 240. The chain created by entries 220 through 240 is commonly called a linked list.

Chained hash tables are described in more detail in Friedman et al., "Hashtables for Embedded and Real-Time Systems," IEEE Real-Time Embedded System Workshop (2001), the disclosure of which is hereby incorporated by reference.

There are several problems with chained hash tables when these tables are used in embedded systems in particular. One major problem with chained hash tables is handling of linked list entries, such as entries 230 and 240, as this handling relates to multithreaded processors. These problems will be described in more detail below, after an introduction to open hash tables is given.

Another technique used for dealing with collisions is using an open hash table, also called an "extant" hash table. An open hash table resolves a collision by rehashing to a new index, repeating this rehashing step until an available index in the table is found. Linear probing is a simple rehashing strategy that simply looks in the subsequent index location, modulo the table size, until it finds an available index. Rehashing strategies, like effective hash functions, are outside the scope of this disclosure, but this description uses the above, four digit to two digit hash function with linear probing to illustrate a problem being solved.

Exemplary open hash tables are shown in FIGS. 3 through 6, and these tables are used to illustrate problems associated with open hash tables. The table 300 shown in FIG. 3 is an initially empty hash table. Table 300 shows the first 10 indices of a 100-entry hash table at table construction time. Each location is marked "empty," which is one of three entry statuses for an entry in an open hash table. Suppose the following four-digit keys are inserted in this sequence: 0110, 0210, 0119, 0005, and 0099, yielding hash indices 1, 2, 1, 0 and 0 respectively. An application using key 110 finds index 1 empty and uses index 1. An application using key 210 finds index 2 empty and uses it. The entry at index 2 is marked "used," which is the second of three statuses for an entry in an open hash table. An application using key 119 finds index 1 in use, rehashing to index 2, which is in use, then rehashing to index 3, which it uses. An application using key 5 finds index 0 empty and uses it. Finally, an application using key 99 tries indices 0 through 3, settling on index 4, giving the table configuration shown in table 400 of FIG. 4. Other hashing and rehashing strategies would give a different configuration for table 400, but the concepts of collisions and corresponding searching through the table remain the same.

If, after constructing the configuration of table 400, the application performs a series of searches for keys contained in the table, in order to retrieve data associated with individual keys (additional data not shown), key search through the table proceeds similarly, terminating either when the key of interest or an empty entry is found. Searching for key 99, which hashes at index 0, proceeds linearly from index 0 until the application finds its key at index 4. Searching for key 88, which also hashes to 0, proceeds until the first empty entry encountered at index 5, whereupon the search terminates.

Deleting an entry from an open hash table introduces a third and final status of entry status, "deleted." Suppose an application deletes key 210 from the table. It locates the index of the key via hashing, and marks its status as deleted, as shown in table 500 of FIG. 5. An application cannot simply mark the status as empty, because an empty entry terminates the search for any key, and index 2 still lies between initial hash locations and additional entries. If deletion of 210 had marked index 2 as empty, a subsequent search for key 99 would terminate at index 2. But deleted entries do not terminate retrieval searches. The process of retrieving key 99 proceeds through the deleted entry as the application rehashes in search of its entry or an empty entry. An application that inserts a new key, for example 111 (which hashes to index 1), would first search through the deleted entry to the empty entry at index 5; upon discovery that 111 is not in the table, the application would again hash to location 1 and begin rehashing again, but this insertion phase would reuse the deleted entry space at index 2, placing 111 there as a used entry.

Suppose that, instead of inserting 111, a deletion of key 210 is followed by deletion of keys 5, 110, and 119 in any order. These deletions result in the configuration of table 600 shown in FIG. 6. Key 99 is the only remaining key in this portion of the 100-entry table. Yet note that every search for key 99, which hashes to index 0, must inspect locations 0 through 3 before discovering 99 at location 4. This chain of searches across deleted entries wastes time; after many insertions and deletions in a hash table, the search time for a key not in the table can come to equal the full size of the table—perhaps thousands of entries—even if most of those entries are marked deleted. Every insertion of a new key requires searching until the first empty entry is found (or until the table is searched exhaustively); only then can insertion start at the hash key index, inserting the new key at the first deleted or empty entry found. An open hash table filled with mostly deleted entries requires exhaustive search for new key insertion as well as lookup for keys that are not present. Exhaustive search time is inappropriate for both real-time, with critical time constraints, and less time constrained applications.

A brute force approach for non-real-time applications is to read all used entries from an aging table periodically and hash their keys into a new table consisting, initially, of empty entries. Reconstructing a table with the keys of table 600 would hash 99 to index 0 in a new table, where in this case a hash of 99 would suffer from no collision. No deleted entries would exist in the new table during construction. The algorithms described in D. Knuth, "The Art of Computer Programming, Vol. 3, Sorting and Searching," Addison-Wesley (1973) and T. Szymanski, "Hash Table Reorganization," Journal of Algorithms 6(3), 322–335 (1985), both of which are hereby incorporated by reference herein, improve on the brute force approach. Specifically, the algorithms in the Knuth and Szymanski references allow table reorganization within the space of one existing table, but these algorithms each suffer from the same defect with respect to real-time applications. In particular, these algorithms reconstruct the remaining valid keys into a new table organization monolithically, which means the entire table must be reconstructed within one operation before it can be used. This process incurs a large execution time penalty during table reorganization. This penalty causes real-time, reactive applications that rely on a hash table to miss their deadlines, just as searching long chains of deleted entries causes missed deadlines. Thus, conventional methods for reorganizing open hash tables are generally too slow for real-time systems.

A chained hash table also presents some problems for a real-time system, particularly memory latency and multithreading contention. As described above, a chained hash table uses linked lists to avoid collisions. As stated in B. Carlson, "Packets Challenge Next-Gen Nets," EE Times, August, 2002, the disclosure of which is hereby incorporated by reference, "On the other hand, when thousands of flows or connections are involved the data structure is most likely in external memory and requires more time to access. The worst-case situation is when the data is stored in external memory in a linked list. For the linked list to be traversed, several dependent memory-read and memory-write operations are necessary. One memory access needs to finish before another one starts, resulting in very long latencies." The linked list at a hash table index incurs several problems for a network processor or other real-time system, as detailed below.

First, even in a zero-collision case, at least two memory accesses must occur to inspect a key residing in the table. The first access reads a reference in a bucket in the hash table to the linked list element, and the second access reads fields from the list element. A bucket, as described in additional detail below, is a fixed-size sequence of contiguous hash table entries. Open hashing, as performed with open hash tables, requires only one memory access to read a non-colliding key from a one-element bucket.

Second, a serial linked list guarantees that each key hashing to a given index (i.e., colliding) adds one element to the linked list to be searched, increasing the search time for all colliding keys. Open hashing for two distinct, colliding keys, on the other hand, need not rehash these keys to the same rehash location in the collision-following step. With a rehash increment based on the original key but different from the hash index itself, open hashing embeds a distinct implicit list in the table for every key, regardless of whether two keys collide at a given index.

Third, multithreading poses some of the biggest problems for chained hash tables. When multiple threads have concurrent access to a table, any thread modifying a table entry must lock its bucket so that it cannot be read or written concurrently by other threads, particularly when two or more interdependent fields must be modified atomically by the writing thread in order to maintain consistency. Reading threads must avoid access during modification. This restriction on multithreaded access to enforce atomicity of related changes is the well-known critical section problem, as described in Carlson, already incorporated by reference above. Open hash tables share the need to restrict concurrency within a bucket being accessed by multiple threads, but the problem is worse for chained hashing because of a global free list of currently unused list elements.

In chained hashing, linked list entries that are not currently in use are stored in a global free list. In a multithreaded hashing application, such as that performed by a multithreaded network processor, every thread that wishes to store a new key and its data in a chained hash table, and every thread that wishes to delete an old key and its data from the chained hash table, must lock the global free list so that other threads do not inspect or modify the global free list concurrently, in addition to locking a linked list of a particular entry during inspection or modification. While multiple threads in both forms (i.e., chained and open) of hashing need not restrict each other when accessing different buckets—and a good hashing algorithm supports bucket scattering for different keys—every insertion and deletion in chained hashing requires locking the bucket of interest and the global linked list before inserting or deleting an entry in the bucket. Chained hashing steps for a new insertion, for example, include the following: a) locking and searching the bucket; b) locking the free list; c) reading the free list reference into a register; d) updating the free list reference to the following entry; e) unlocking the free list; f) reading the reference from the bucket into a register, g) updating the reference for the new entry to point to the current first entry in the bucket; h) updating the reference in the bucket to point to the new entry; i) storing the key and dependent data in the new entry; and j) unlocking the bucket. There are two lock-unlock pairs and 5+S+D memory accesses, counting the initial bucket search as "S," and the key and data insertion as "D." Term S includes reading list links from memory. Open hashing steps for a new insertion, assuming room in the bucket, include: a) locking and searching the bucket, b) storing the key and dependent data in the new entry, and c) unlocking the bucket. Each collision costs a rehash, and a repeat of these three steps. There is one lock-unlock pair and S inspection memory accesses for each bucket, and D insertion accesses as before.

Worst of all for chained hashing, there is global contention among all participating threads for locking the free list, resulting in global stalls not encountered with open hashing. Open hashing has no global bottleneck comparable to the free list; bucket locking is local.

Thus, the use of a global free list to support chained hash tables is a serious impediment to use of chained hash tables on a multithreaded processor running a multithreaded hashing application.

The following variables and functions describe generic hashing, not hashing specific to the present invention. Sections II and IV give example pseudocode for functions introduced by the present invention.

Variable names and uses:

| | |
|---|---|
| isempty(tableEntry): boolean | a predicate function that returns true if its table entry is empty, otherwise returning false |
| isused(tableEntry): boolean | a predicate function that returns true if its table entry is occupied by a key and the key's dependent data, otherwise returning false |
| isdeleted(tableEntry): boolean | a predicate function that returns true if its table entry is deleted, otherwise returning false |
| numentries: integer | a constant giving the number of entries (i.e., distinct indices) in a hash table |
| bucketsize: integer | a constant giving number of entries in a bucket, which is divisible into numentries |
| numbuckets: integer | a constant giving the number of buckets in a hash table, i.e., numentries/bucketsize |
| table: HashTable | a hash table of numentries entries, each of which is of type tableEntry |

The main hash table search function is find( ), described below. It manages hash table searching, insertion and deletion. Comments describe each of its parameters. In this example, find( ) returns true if its key resides within the table, and it returns false if its key does not reside within the table. A different definition of find( ) might also return the entry index of a key within the hash table, or the contents of the entry, rather than simply returning true or false.

| | |
|---|---|
| find(key, | find this key in table (if present), |
|   tbl: HashTable, | the table to search |
|   isdelete: boolean | if true, then delete this key's entry as soon as it is found |
|   earlyinsert: boolean | if true, then insert this key at the first deleted or empty index unless the key is found first |
| ): boolean | return true if key is in table, else false |

The definition of find( ) in pseudocode follows. Comments are delimited by // and the end of the line.

```
Let bucix = hashFunction(key)        // bucix is initial bucket index within the table
Let I = 0
While (I < numbuckets)               // search all buckets or until found
    Let entryix = 0                  // entryix searches within a bucket
    While (entryix < bucketsize)
        If (isused(entry at tbl bucket bucix, offset entryix) AND entry's key equals
                key parameter)
            // The key has been found in table, check if
            // parameter 'isdelete' wants to delete it.
```

```
          If (isdelete)
               Mark entry at tbl bucket bucix, offset entryix as deleted
               return(true)            // return to caller; entry was found
          Else if (earlyinsert AND NOT isused(entry at tbl bucket bucix, offset
                    entryix))
                                       // Insertion goes into the first empty or deleted
                                       // entry found.
               Insert this key and its data at bucket bucix, offset entryix., mark entry
                    as used
               return(true)            // return to caller; entry was found or inserted
          Else if (isempty(entry at tbl bucket bucix, offset entryix))
                                       // search terminates at an empty entry
               return(false)           // return to caller; entry was not found
          Let entryix = entrix + 1
                                       // try next entry within bucket
     Let bucix = rehashFunction(key,bucix)
                                       // rehash to another bucket
     Let I = I + 1                     // try another bucket until all buckets have been
                                       // tried
return(false)                           // not found anywhere in table
```

Three functions for inserting, retrieving and deleting keyed data are defined in terms of find( ):

```
Put(key): boolean                 // insert key into the table
                                  if it's not already
                                  // there, returning false if
                                  there's no room
If (find(key,table,false,false))
     return(true)                 // key is already in table
return(find(key,table,false,true))
                                  // find inserts key that was not
                                  already there
Get(key): boolean                 // retrieval -- return true if key
                                  is in table
     return(find(key,table,false,false))
Rem(key): boolean                 // remove - delete key from table
     return(find(key,table,true,false))
```

The above constants, variables and functions provide one example implementation of traditional hashing that does not use the current invention.

II. Exemplary System and Method

The present invention in an illustrative embodiment avoids the monolithic reconstruction of a hash table by incrementally building a new hash table as used entries from an aging hash table are copied into the new hash table. Moreover, the present invention is not limited to a particular table size, hash function, or rehashing strategy, but works with any table size, hash function, or rehashing strategy used with an open hash table.

Aspects of the present invention copy used entries from one hash table, called an "alternate" hash table, to another hash table, called a "current" hash table. Once all used entries have been copied, the alternate hash table is cleaned, meaning that all entries are marked as empty. Once all entries in the alternate hash table have been marked as empty, the two tables are switched, such that the new current hash table is the former alternate hash table and the new alternate hash table is the former current hash table, and copying begins again. During the cleaning phase, hash table operations access only the current hash table. During the copy phase, hash table operations access both the current hash table and the alternate hash table.

In this disclosure, a "hash table operation" is intended to include, by way of examples, an operation to find a key in a hash table, retrieve a key or data associated with the key from a hash table, insert a key or data associated with the key into a hash table, or delete a key or data associated with the key from the hash table. The operations of copying a used entry from one hash table to another and marking entries as empty in a hash table are considered table reorganizer operations and not hash table operations.

In additional aspects of the invention, hash table reorganization is performed at particular times in order to reduce the overhead and improve performance associated with the reorganization.

It should be noted that Friedman et al., in "Hashtables for Embedded and Real-Time Systems," already incorporated by reference above, specifically state that extant or open hash tables are not suitable for real-time applications. However, the present invention uses open hash tables in such a manner as to be suitable for real-time applications. Moreover, the present invention allows multithreaded hashing to occur, which is very hard to do with the chained hash tables described in Friedman.

An illustrative hash table suitable for use in conjunction with the present invention has three primary operations: Get (i.e., key-based retrieval), Put (i.e., key-based insertion) and Remove (i.e., key-based deletion). In standard open hashing, Get works by searching from the hash index of a key, through 0 or more rehash steps, until Get finds the key; an empty entry terminates Get with failure, i.e., the key is not in the table. Put invokes Get to find the key; if the key is not present, Put searches from the initial hash index, rehashing across used table entries, placing the key and its associated data in the first empty or deleted location found. Finally, Remove searches similar to Get; if it finds the key, Remove marks that entry as deleted. The descriptions of the present invention illustrate the invention in terms of redefining Get, Put and Remove, although any techniques suitable for use with the present invention may be used.

For the purposes of the present description, the term bucket is intended to include, by way of example, a fixed-size sequence of contiguous table entries from hash tables such as those discussed above. There is a single bucket size for each hash table, and the total number of entries in the hash table is divisible by the bucket size; dividing the number of hash table entries, numentries, by the bucket size, bucketsize, gives the number of buckets, numbuckets. For example, a 100-entry table with a bucket size of 4 would have bucket 0 at indices 0 . . . 3, bucket 1 at indices 4 . . . 7, and so on, culminating in bucket 24 at indices 96 . . . 99 (i.e., 25 buckets total). Hashing selects a bucket rather than an individual entry, and searching within a bucket proceeds serially. The examples of tables 300 through 600 still apply if their bucket size is equal to 1; in that case, hashing to an entry and hashing to a bucket are equivalent. A bucket has relevance for a segmented memory addressing scheme, where all locations in a memory segment are accessed efficiently as a unit; a segment serves as a bucket. A non-segmented RAM has a bucket size of 1.

Figure 7:
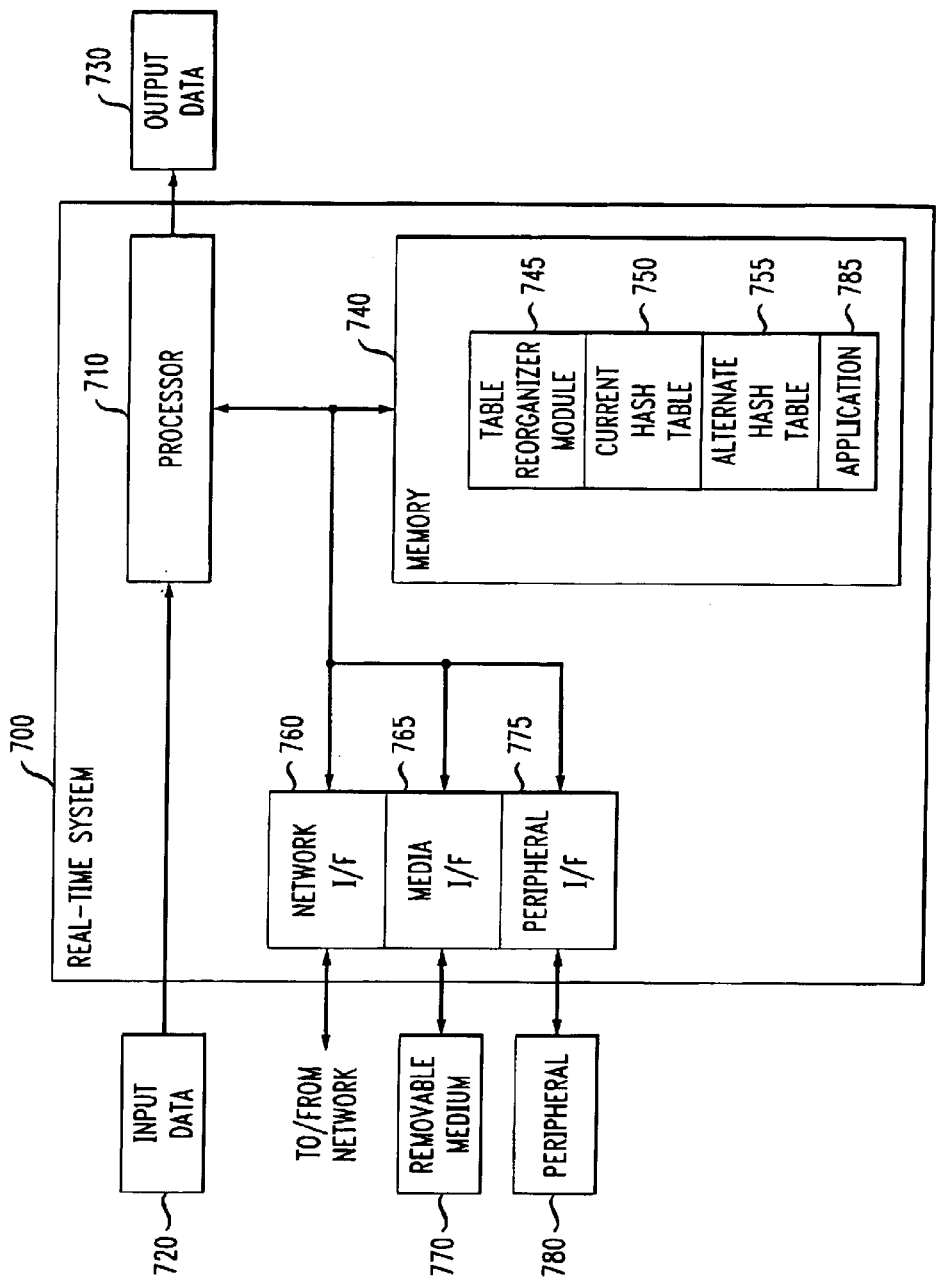
FIG. 7 is a block diagram of a real-time system operating in accordance with a preferred embodiment of the present invention.

Referring now to FIG. 7, a real-time system 700 is shown operating in accordance with a preferred embodiment of the present invention. Real-time system 700 is shown accepting input data 720 and producing output data 730, and is shown interacting with removable medium 770, a network, and a peripheral 780. Real-time system 700 comprises a processor 710, a memory 740, a network interface 760, a media interface 765, and a peripheral interface 775. Memory 740 comprises a table reorganizer module 745, a current hash table 750, an alternate hash table 755, and an application 785. Table reorganizer module 745 comprises (not shown but described below) a number of operations suitable for accessing a hash table and a table reorganizing process. Generally, table reorganizer module 745 comprises Get, Put and Remove operations and a table reorganizer process. In this example, real-time system 700 is a single-threaded system. However, multithreading is described below in reference to FIG. 10.

The application 785 extracts a key from input data 720. This key, as described above, is used, via table reorganizer module 745, to access one or more of current hash table 750 and alternate hash table 755. The table reorganizer module 745 determines data associated with the key from the input data 720 and provides the determined data to the application 785. Application 785 uses the determined data in order to produce output data 730.

For example, if real-time system 700 is a network processor, the input data could be a packet described by the Internet Protocol (IP) and having an IP address contained within the packet. The application 785 could be a routing application, which determines the IP address contained within the input data 720. Application 785 provides the IP address as a key to the table reorganizer module 745, which determines an index into one or both of the hash tables 750, 755 and determines an outgoing IP address associated with the index. The application 785 then uses the outgoing IP address to create another IP packet to be transmitted, which is output data 730.

Input data 720 can be input to the processor 710 via any suitable mechanism, such as network interface 760, media interface 765, and peripheral 780. Similarly, output data 730 can be output over any suitable mechanism, such as network interface 760, media interface 765, and peripheral 780.

Memory 740 stores instructions suitable for configuring the processor 710 to perform the present invention. Processor 710 loads instructions from memory 740 in order to execute the instructions. Suitable instructions may be loaded into memory 740 via network interface 760 and media interface 765 or through other interfaces. The memory 740 could be distributed or local and the processor 710 could be distributed or singular. The memory 740 could be implemented as an electrical, magnetic or optical memory, or any combination of these or other types of storage devices. Moreover, the term "memory" should be construed broadly enough to encompass any information able to be read from or written to an address in the addressable space accessed by processor 710. With this definition, information on a network, accessible through network interface 760, is still within memory 740 because the processor 710 can retrieve the information from the network. It should be noted that each distributed processor that makes up processor 710 generally contains its own addressable memory space.

The methods and apparatus discussed herein may be distributed as an article of manufacture that itself comprises a machine-readable medium having machine-readable code means embodied thereon. The machine-readable program code means is operable, in conjunction with a computer system such as real-time system 700, to carry out all or some of the steps to perform the methods discussed herein. The machine-readable medium, such as removable medium 770, may be a recordable medium (e.g., floppy disks, hard drives, optical disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The machine-readable code means is any mechanism for allowing a computer, processor or other machine to read instructions and data, such as magnetic variations on a magnetic medium or height variations on the surface of a compact disk.

It should be noted that table reorganizer module 745 could be made to be part of application 785, such that there is no separate table reorganizer module 745. Furthermore, portions of table reorganizer module 745 could be made to be part of application 785, while other portions are separate. For example, the Get, Put, and Remove operations could be part of application 785, while a table reorganizer process could be part of table reorganizer module 745. There are a multitude of possible configurations, based on operating system, programming language, and other variables. Additionally, part or all of the functionality of the present invention may be placed into hardware such as a gate array, integrated circuit, or other suitable circuitry. For example, the table reorganizer process could be placed into circuitry, e.g., into processor 710 or memory circuitry 740, while Get, Put and Remove could be part of a software application 785.

Another way of considering real-time system 700 is that input data 720 is an event or stimulus that requires a response, which is output data 730. There are two possible definitions of real-time response to events in a real-time system. Instantaneous real-time response, also known as hard real-time response, means that processing responds to the arrival of an input event, such as the arrival of a packet to be classified by a network processor, in time that is bounded by a constant. Every reaction has a known upper bound. Average real-time response, on the other hand, means that the average response time by a set of processing reactions to a corresponding set of input event arrivals is bounded by a predictable constant. An individual time for a processing response may vary from other responses, but in the aggregate, reactions lie within a predictable time bound. Hash tables are intrinsically statistical data structures; the number of rehashes may vary from key to key, depending on the quality of the hash function and rehash strategy, the distribution of keys, and the degree to which the hash table is filled. Therefore, the present invention works to bound the average response time of a hash table operation (e.g., Get, Put or Remove, as described above) to a predictable range not possible with conventional hashing. The present invention also works to bound the maximum response time and response time deviation from average when a representative sample of operations is available for characterization. To determine a representative sample of operations, it is beneficial to have both samples of Get/Put/Remove operations and the keys given to these operations to characterize the response time.

Figure 8:
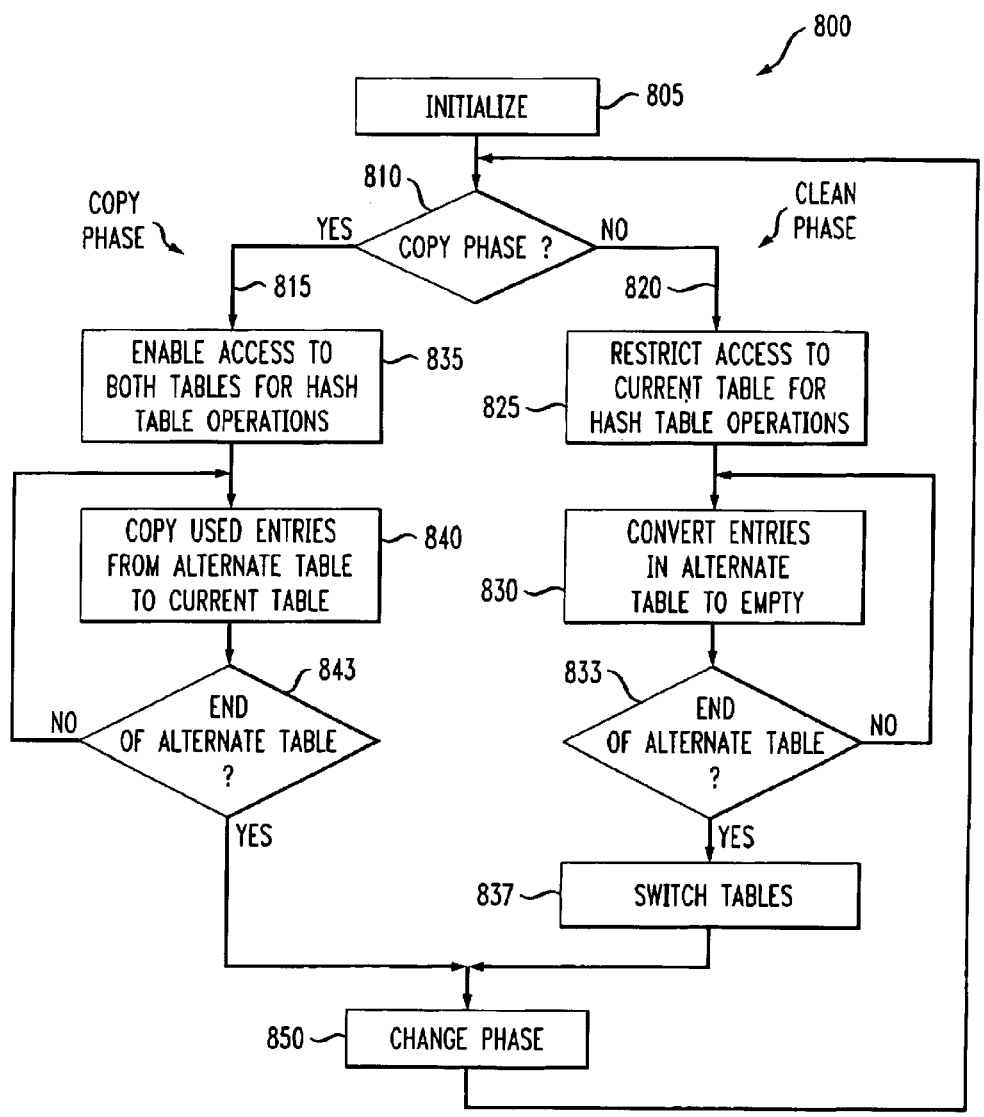
FIG. 8 is a flow diagram of an exemplary method used by a real-time system to perform incremental reorganization of hash tables, in accordance with a preferred embodiment of the present invention.

Turning now to FIG. 8, a method 800 is shown for performing incremental hash table reorganization. Method 800 is performed by a real-time system to reorganize hash tables in order to reduce the time delay, on average, for finding information corresponding to a key. In step 805, initialization is performed. When a real-time system begins operating, step 805 will be performed. Generally, step 805 is executed only during initialization or re-initialization of a real-time system. The present invention performs incremental hash table reorganization by maintaining two hash tables, with the current hash table being the table receiving new insertions from Put, and the alternate hash table being the aging table from which the present invention filters out deleted entries. Table reorganization preferably proceeds in two phases, the copy phase and the clean phase. In step 805, the current hash table and alternate hash table are allocated, each entry in the current hash table is marked as empty, and the clean phase is selected. The clean and copy phases are phases controlling, as described in more detail below, the operation of the Get, Put and Remove operations and the table reorganizer process.

In step 810, it is determined if the current phase is the copy phase. If the current phase is the copy phase (step 810=YES), path 815 is taken. During the copy phase, both tables may contain valid keys. Therefore, in step 835, access is enabled to both the current hash table and the alternate hash table for hash table operations. In the copy phase, Get searches the current hash table for a key and, if Get doesn't find the key, Get searches the alternate hash table; likewise Put searches both tables before inserting new entries in the current hash table; Remove deletes its key from both tables. A table reorganizer process is invoked, in one embodiment of the present invention, at the end of Get, Put and Remove operations to perform one table reorganization step. The table reorganizer process advances an index variable, called "cleanix" herein, through the alternate hash table, one entry per invocation of the table reorganizer process. In the copy phase, when the table reorganizer process finds a used entry (i.e., a valid key) in the alternate hash table, it puts that key into the current hash table as a normal insertion. Thus, in step 840, used entries are copied from the alternate hash table to the current hash table by the table reorganizer process. Eventually, the variable cleanix is advanced to the end of the alternate hash table, and the table reorganizer process moves into the clean phase, resetting the variable cleanix to the start of the alternate hash table. Thus, in step 843, it is determined whether the end of the alternate hash table has been reached. If so (step 843=YES), the phase is changed in step 850 by changing the phase from the copy phase to the clean phase and resetting the variable cleanix to the start of the alternate hash table. Method 800 continues again at step 810. At this point, the table reorganizer process has copied all keys from the alternate hash table to the current hash table, and all new Put insertions are going into the current hash table.

If the end of the alternate hash table has not been reached (step 843=NO), the method 800 continues in step 840. During steps 840 and 843, Get, Put and Remove operations still occur on both the current hash table and the alternate hash table. In fact, in one embodiment of the present invention, each Get, Put and Remove operation starts step 840.

If step 810 determines that the current phase is not the copy phase (step 810=NO), then path 820 is taken, which corresponds to the clean phase. During the clean phase, each call to the table reorganizer process sets all entries in one bucket within the alternate hash table to empty. The alternate hash table is not consulted by Get, Put or Remove during the clean phase. Thus, in step 825, access is restricted by Get, Put and Remove to the current hash table. Entries are converted by the table reorganizer process, in step 830, to empty. At the conclusion of the clean phase, when the variable cleanix is advanced to the end of the alternate hash table, the table reorganizer process returns into the copy phase, resetting the variable cleanix to the start of the alternate hash table. Therefore, when the end of the alternate hash table is reached (step 833=YES), the phase is changed in step 850 from the clean phase to the copy phase and execution returns to step 810. Prior to returning to the copy phase, the table reorganizer process reverses the roles of the current and alternate hash tables (in step 837) so that the previous alternate hash table (which is now completely empty) becomes the current hash table (for new insertions), and the previous current hash table now becomes the alternate hash table to be filtered for deleted entries by having its used entries copied.

If the end of the alternate hash table has not been reached (step 833=NO), then method 800 continues in step 830. During steps 830 and 833, Get, Put and Remove operations still occur on the current hash table. In fact, in one embodiment of the present invention, each Get, Put and Remove operation starts step 830.

Method 800 will continue to operate until such time as it is stopped by a real-time system. By using the copy and clean phases, the present invention incrementally cleans a hash table. This can be shown to reduce average access times to hash tables.

Method 800 assumes that the table reorganizer process is executed for every Get, Put and Remove operation performed on a hash table. However, as described below, there are multiple options for determining when the table reorganizer process should be invoked.

It should be noted that method 800 does not require creating a new hash function, as is required when a chained hash table is resized. While it is possible to support resizing of the current hash table and alternate hash table in the present invention, generally the current hash table and alternate hash table are fixed sizes. Therefore, there is no need to determine a new hash function during incremental updating of the hash tables, and a single hash function may be used.

The table shown in FIG. 9 summarizes the actions of Get, Put and Remove during the clean and copy phases of the present invention.

What follows is an exemplary pseudocode implementation of FIGS. 8 and 9. This pseudocode is only one way of implementing an embodiment of the present invention and it is in no way limiting, as there are many different ways of implementing embodiments of the present invention.

This illustration of an embodiment of the invention replaces hash table table : HashTable of the conventional pseudocode, described above, with the following variables.

| | |
|---|---|
| table0: HashTable | one hash table of numentries entries, each of which is of type tableEntry |
| table1: HashTable | another hash table of numentries entries, each of which is of type tableEntry |
| curtable: HashTable | a reference to either table0 or table1, initialized to refer to table0 |
| alttable: HashTable | a reference to either table0 or table1, initialized to refer to table1 |
| cleanix: integer | an index into 1 entry within alttable, initialized to 0 |
| copyphase: boolean | false for "clean phase," true for "copy phase," initialized to false (clean phase) |

This illustration of the invention redefines functions Put, Get and Rem to invoke the table reorganizer process.

```
Put(key) : boolean                          // insert key into the table if it's not already
                                            // there, returning false if there's no room
    CheckReorganizationPhase( )
    If (find(key,curtable,false,false))
                                            // check in curtable first
        ManageCollect( )
        return(true)                        // key is already in curtable
    If (copyphase AND find(key,alttable,false,false))
                                            // if not in curtable, try alttable
        ManageCollect( )
        return(true)                        // key is already in alttable
    Let result = find(key,curtable,false,true)
                                            // find inserts key into curtable that was not
                                            // already there
    ManageCollect( )
    return(result)
Get(key) : boolean                          // retrieval -- return true if key is in table
    CheckReorganizationPhase( )
    Let result = find(key,curtable,false,false)
                                            // try curtable first
    If (copyphase and NOT result)
        Let result = find(key,alttable,false,false)
                                            // else try alttable
    ManageCollect( )
    return(result)
Rem(key) : boolean                          // remove - delete key from table
    CheckReorganizationPhase( )
    Let result = find(key,curtable,true,false)
    If (copyphase)                          // key may be in alttable as well
        Let altresult = find(key,alttable,true,false)
        Let result = result OR altresult
    ManageCollect( )
    return(result)
ManageCollect( )
    // For some fraction of the calls to ManageCollect (defaulting to 1 -- every call
    // to ManageCollect -- but this can be set to 1 out of every 2 calls, 2 out of
    // every 3, or any fraction; it can also be set to an integer, e.g., twice for every
    // ManageCollect call, three times, etc. This allows empirical testing of
    // table reorganization frequency.
        Invoke TableReorganization( )
CheckReorganizationPhase( )                 // ensure that cleanix is within alttable, change
                                            // phases when it goes beyond alttable
    If (cleanix has exceeded numentries)
        Let cleanix = 0
        Let copyphase = NOT copyphase
                                            // from clean phase to copy phase, or from copy
                                            // phase to clean phase
        If (copyphase)                      // Going into copyphase switches the roles of
                                            // table0 and table1 as curtable and alttable
```

```
            Let tmp = curtable        // tmp is a reference to table0 or table1, like
                                      // curtable and alttable
            Let curtable = alttable
            Let alttable = tmp
TableReorganization( )
    Let bucket = cleanix / bucketsize
                                      // integer division discards any fraction, gives
                                      // bucket containing entry at cleanix
        If (copyphase)                // copying alttable into curtable, copy 1 used
                                      // entry if there is one in this bucket
            Let entryix = cleanix modulo bucketsize
                                      // offset of cleanix in this bucket
            While (entryix is not past the end of this bucket, i.e., within bucketsize)
                If (isused(entry at alttable bucket, offset entryix))
                                      // found a key in alttable
                    Let cleanix = cleanix + 1
                                      // for next time
                    copyput(key at alttable bucket, offset entryix)
                                      // do NOT delete key from alttable
                    break out of While loop
                Let cleanix = cleanix + 1
                                      // Look further
                Let entryix = entryix + 1
        Else                          // clean phase, clean entire bucket
            Set all bucketsize entries within bucket to empty
            Let cleanix = cleanix + bucketsize
copyput(key)                          // helper for TableReorganization that only
                                      // copies from alttable into curtable
    // Key being copied will not be in both tables, because only copyput can cause
    // it to be in both tables, so just copy from alttable to curtable.
        return(find(key,curtable,false,true))
```

III. Additional Examples

The table reorganizer process need not be invoked by Get, Put or Remove, but also could also be invoked from other functions in a system, e.g., by a background thread that runs during lulls in real-time activity.

The table reorganizer process need not be invoked on every call to Get, Put and Remove. Experiments with typical network data for a network address translation application of an embodiment of the present invention show that only a fraction of the Get, Put and Remove invocations need to invoke the table reorganizer process. Reducing the number of times that the table reorganizer process is called can enhance performance in certain instances.

One technique to limit the number of invocations of the table reorganizer process is to invoke the table reorganizer process only a fixed fraction, determined by a programmer, of Get, Put and Remove operations. This technique assumes that the programmer makes a correct choice for the fixed fraction.

Another technique for limiting the number of invocations of the table reorganizer process is that an invocation of Get, Put or Remove could invoke the table reorganizer process only when the application work of that Get, Put or Remove has not exceeded some threshold set by the programmer. Thus, rather than use a fixed fraction to determine how often to invoke the table reorganizer process, a fixed threshold is used. Broadly, the number of probes, where a probe is an access to an entry or bucket in a hash table, for a Get, Put or Remove is tracked and the table reorganizer process is invoked when the number of probes has not exceeded the fixed threshold. This technique is called a "dynamic technique" herein, and the technique is dynamic because it determines, on the basis of the hash table cost of each individual call to Get, Put or Remove, whether to tax the individual call with the additional call to the table reorganizer process. The main effect is to reduce the maximum number of table probes and the deviation from average required by Get, Put or Remove. The effect occurs because Get, Put or Remove invocations with relatively high table probe counts after doing their application work are not taxed with table reorganizer process calls; only Get, Put or Remove invocations with low application probe counts are taxed with table reorganization.

One limitation of the dynamic technique is that the programmer must set the threshold, but the threshold depends on the keys being processed and the sequence of Get, Put and Remove operations being processed. Experiments show that samples with a good percentage of Get operations work most efficiently with a threshold of one. The minimal number of probes required by a Get call that finds its key on the initial hash is one. Only those Get calls with ideal hashing need to invoke the table reorganizer process. Unfortunately, a long stream of samples consisting solely of Put operations with distinct keys should not use a threshold of one, because during the copy phase, Put with a new key requires a minimum of three table probes, even with no rehashing. Put must search the current table once and the alternate table once before inserting its key in the current table. The most efficient threshold for such sample sequences turns out to be three; any threshold less than three results in no invocations of the table reorganizer process, and performance decreases. But three adds unnecessary overhead for the samples containing a typical number of Get calls, where a threshold of one is best.

In an adaptive enhancement to the dynamic technique, the table reorganizer process records the minimum number of hash table probes (not counting table reorganization probes) for the minimal-cost Get, Put and Remove operation within a window of some fixed number of Get, Put and Remove operations. At the conclusion of the window, the table reorganizer process sets its threshold to that minimum, discarding its previous threshold. The table reorganizer process then sets about determining a new minimum for a new sequence of Get, Put and Remove operations of the window size, repeating the process. Using a window size determined experimentally, this approach converges rapidly on an efficient table reorganization threshold for its current sample mix (e.g., packet traffic), yet it adapts readily to changes in the sample mix (e.g., traffic patterns).

A final technique is the timeout enhancement, which applies to hash tables where each used entry is valid for only a finite period time after the most recent Put or Get operation on the key for that entry. Such tables do not provide the Remove operation; the logical equivalent of Remove occurs when an entry occupies a table location after its timeout period has expired. Each Put or Get operation that locates its keyed entry must update a timestamp field in that entry with the new expiration time for that key. Searches that detect entries with expired timestamps treat those entries as having deleted status; table reorganization does not copy these deleted entries. The advantage of this embodiment of the present invention over alternatives such as content addressable memory (CAM) is that it is not necessary to use interrupt timers or other active means to search the hash table for removing expired entries from the table. By treating expired hash table entries as deleted entries during the copy phase, the timeout technique avoids explicit search for expired entries. CAM, on the other hand, appears to require explicit timeout instruction processing for expired entries, because there is no "copy phase" that can treat expired used entries as deleted entries.

IV. Multithreading Examples

As noted above, the techniques of the present invention are suitable for multithreaded real-time systems. There are a number of ways to implement the present invention in order to allow multiple accesses to the current hash table and the alternate hash table at the same time, when the table reorganizer process is in the copy phase, and to the current hash table, when the table reorganizer process is in the clean phase. One such implementation is described below.

Figure 10:
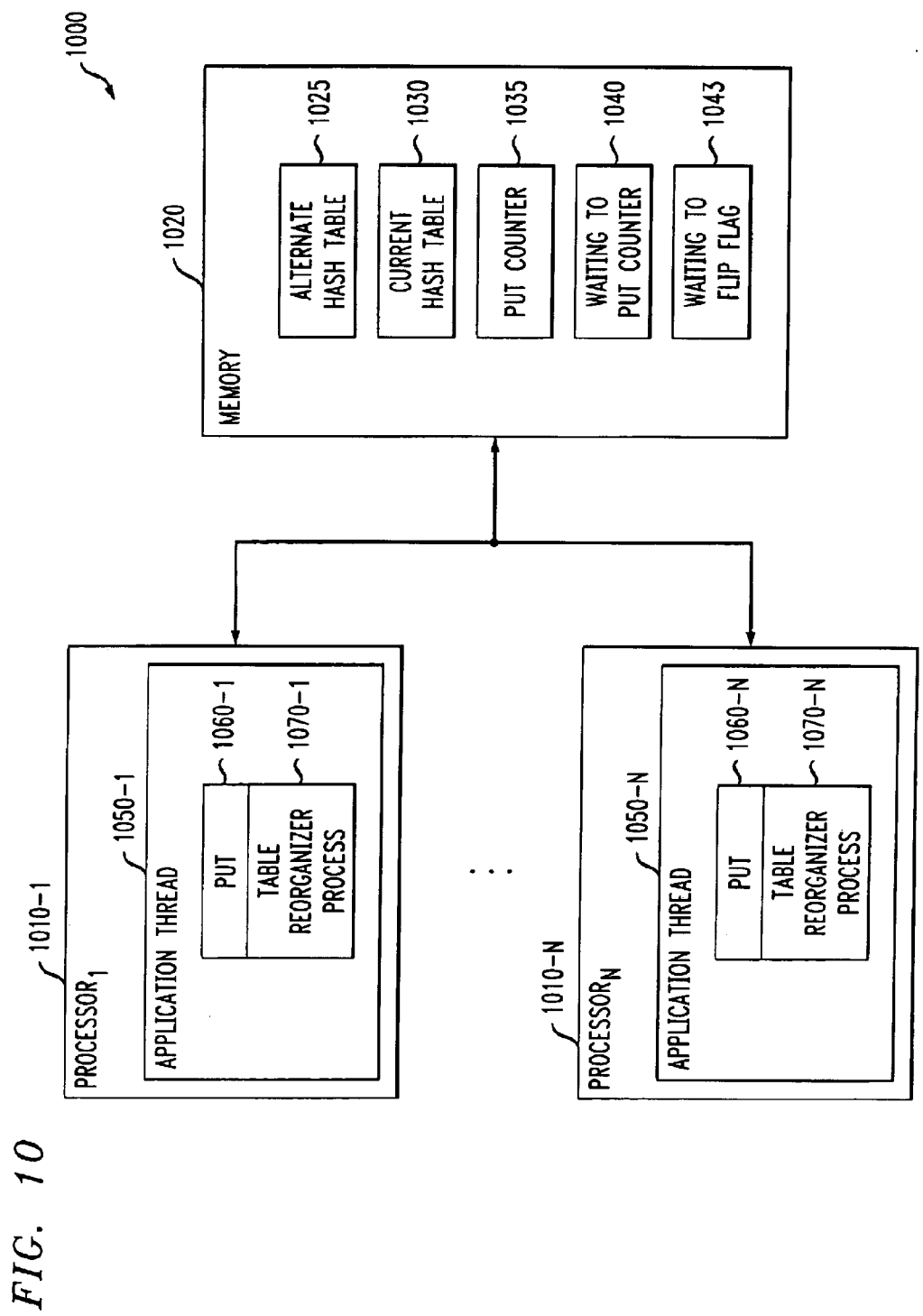
FIG. 10 is a block diagram of a multithreaded real-time system operating in accordance with a preferred embodiment of the present invention.

Turning now to FIG. 10, a multithreaded real-time system 1000 is shown. Real-time system 1000 comprises N processors 1010-1 through 1010-N (collectively, "processors 1010") and memory 1020. Memory 1020 can be accessed by each of the N processors, and each processor may also have its own memory (not shown) not accessible by other processors. Memory 1020 comprises alternate hash table 1025, current hash table 1030, a put counter 1035, a waiting to put counter 1040, and a waiting to put flag 1043. Each processor 1010 has an application thread 1050 (called a "thread 1050" herein), and each application thread can invoke a Put operation 1060 and a table reorganizer process 1070. Only Put will be described herein, but similar techniques may be used for other operations that change an entry in a hash table, such as Remove.

Before any thread 1050, for example thread 1050-1, actually Puts into the current hash table 1030, the thread 1050 asks the table reorganizer process 1070-1 whether it is about to flip the use of the two tables (i.e., the current hash table and the alternate hash table). The table reorganizer process 1070-1 keeps a counter of the number of threads currently Putting, and the table reorganizer process 1070-1 keeps track of whether it is about to flip the two tables. If the table reorganizer process 1070-1 is not about to flip, it simply increases the Put counter 1035 and lets that thread 1050-1 perform its Put 1060. When the thread 1050-1 completes its Put 1060, it invokes the table reorganizer process 1070-1 to decrement the Put counter 1035.

When a table reorganizer process 1070, upon completing a clean phase pass, wishes to flip the use of the two tables, it inspects the Put counter 1035. If the Put counter 1035 is zero, the flip is safe, and the table reorganizer process 1070 flips the tables. If the Put counter 1035 is non-zero, the table reorganizer process 1070 sets the waiting to flip flag 1043 and does not proceed with table reorganization. Now, any thread 1050 that wishes to Put 1060, upon asking the table reorganizer process 1070 whether it is about to flip the use of the two tables, is told "yes," and the table reorganizer process 1070 adds that thread 1050 to a waiting to Put counter 1040. Thus there are two counters 1035 and 1040 in this example, one counting the threads actually Putting (i.e., put counter 1035), and another counting the threads waiting to Put (i.e., waiting to put counter 1040). In the simplest implementation, threads 1050 that are waiting to Put 1060 simply keep asking the table reorganizer process 1070 over and over (this is known as "spinning") until the table reorganizer process 1070 says that the flip has occurred and it is safe to proceed with a Put. There are other possible, more complicated alternatives to spinning in software multithreading systems, but the logic stays the same: Wait to Put until it is safe to Put.

In the cases where a flip must wait until all active threads 1050 using Put 1060 have completed, it is actually the last active thread 1050 using Put 1060 that achieves the flip. The last active thread 1050 does the flip when it decrements the Put counter 1035 as noted above. If a Putting thread 1050 decrements the Put counter 1035 to zero and a flip has been delayed, this thread (that has just completed its Put) performs the flip, and moves the waiting to Put counter 1040 into the Put counter 1035, zeroing the waiting to Put counter 1040. Now, when those waiting-to-Put threads 1050 ask whether a flip is pending, they are told "no," and they proceed with their Put 1060.

Also, a clean phase thread that is cleaning a bucket has to act like a Put thread with respect to the flip. One application thread should not be Putting a key into a table that is still being cleaned. Similarly, deletion of entries must also be similarly controlled. Thus, any thread that can cause a change to one of the hash tables must wait until it is determined that the change is safe to make.

What follows is an exemplary pseudocode implementation for the system of FIG. 10. This pseudocode is only one way of implementing an embodiment of the present invention and it is in no way limiting, as there are many different ways of implementing embodiments of the present invention.

This illustration of the invention replaces hash table table: HashTable of the plain algorithm with the following variables.

This variant of the pseudocode given in Section II allows only one thread at a time to perform table reorganization. A more complex variant could allow multiple threads to perform table reorganization at a time.

| | |
|---|---|
| table0: HashTable | one hash table of numentries entries, each of which is of type tableEntry |
| table1: HashTable | another hash table of numentries entries, each of which is of type tableEntry |
| curtable: HashTable | a reference to either table0 or table1, initialized to refer to table0 |
| alttable: HashTable | a reference to either table0 or table1, initialized to refer to table1 |
| cleanix: integer | an index into 1 entry within alttable, initialized to 0 |
| copyphase: boolean | false for "clean phase," true for "copy phase," initialized to false (clean phase) |

-continued

| | |
|---|---|
| activeputs: integer | number of threads currently doing a Put |
| waitingput: integer | number of threads waiting to Put because a curtable-alttable "flip" is pending |
| ready2flip: boolean | initially false, set to true when the table reorganizer wants to flip curtable-alttable |

This illustration of an embodiment of the present invention redefines functions Put, Get and Rem to invoke the table reorganizer.

```
Put(key) : boolean                              // insert key into the table if it's not already
                                                // there, returning false if there's no room
    CheckReorganizationPhase( )
    If (find(key,curtable,false,false))
                                                // check in curtable first
        ManageCollect( )
        return(true)                            // key is already in curtable
    If (copyphase AND find(key,alttable,false,false))
                                                // if not in curtable, try alttable
        ManageCollect( )
        return(true)                            // key is already in alttable
    Wait until StartPut( ) returns true
    Let result = find(key,curtable,false,true)
                                                // find inserts key into curtable that was not
                                                // already there
    FinishPut( )
    ManageCollect( )
    return(result)
StartPut( ) : boolean                           // return true if it's safe to Put a new entry into
                                                // curtable
    If ready2flip is true
        If this is the first call to StartPut for this thread
            Increment waitingput
                                                // count number of threads waiting
        Return false
    Else
        If this is the first call to StartPut for this thread
            Increment activeputs
        Return true
FinishPut( )                                    // thread is done Putting
    Decrement activeputs
    If activeputs equals 0 and ready2flip is true
        Set activeputs = waitingput
                                                // Let the waiting threads run.
        Set waitingput = 0                      // None waiting
        Flip( )
        Set read2flip = false
Get(key) : boolean                              // retrieval -- return true if key is in table
    CheckReorganizationPhase( )
    Let result = find(key,curtable,false,false) // try curtable first
    If (copyphase and NOT result)
        Let result = find(key,alttable,false,false)  // else try alttable
    ManageCollect( )
    return(result)
Rem(key) : boolean                              // remove - delete key from table
    CheckReorganizationPhase( )
    Let result = find(key,curtable,true,false)
    If (copyphase)                              // key may be in alttable as well
        Let altresult = find(key,alttable,true,false)
        Let result = result OR altresult
    ManageCollect( )
    return(result)
```

Note that this implementation assumes only one thread at a time enters StartPut( ), FinishPut( ), ManageCollect( ), CheckReorganizationPhase( ), Flip( ) and TableReoganization( ). Locks for ensuring single-threaded table reorganization are not shown. If more than one thread tries to invoke ManageCollect( ) concurrently, the second and subsequent threads return immediately without table reorganization.

```
ManageCollect( )
    // For some fraction of the calls to ManageCollect (defaulting to 1 -- every call
    // to ManageCollect -- but this can be set to 1 out of every 2 calls, 2 out of
    // every 3, or any fraction; it can also be set to an integer, e.g., twice for every
    // ManageCollect call, three times, etc. This allows empirical testing of
    // table reorganization frequency.
            Invoke TableReorgnization( )
CheckReorganizationPhase( )             // ensure that cleanix is within alttable, change
                                        // phases when it goes beyond alttable
    If (cleanix has exceeded numentries)
        If (copyphase)                  // going from copy to clean phase is not a flip
            //NOTE: If one was to allow multiple threads to perform table
            // reorganization at one time, it would be necessary to wait until all
            // copying threads completed copying before changing the phase to
            // clean, requiring a thread counter. Since only one table
            // reorganization thread is allowed in this implementation, a copy
            // thread counter is not necessary.
                Let cleanix = 0
                Let copyphase = false
                                        // from copy phase to clean phase
        Else                            // going from clean to copy phase, this is a Flip
            If (activeputs > 0)
                                        // There are threads putting, so don't flip the
                                        // tables.
                Set read2flip to true
            Else
                Flip( )
Flip( )
    Let cleanix = 0
    Let copyphase = true
    Let tmp = curtable                  // tmp is a reference to table0 or table1, like
                                        // curtable and alttable
    Let curtable = alttable
    Let alttable = tmp
TableReorganization( )
    Let bucket = cleanix / bucketsize
                                        // integer division discards any fraction, gives
                                        // bucket containing entry at cleanix
        If (copyphase)                  // copying alttable into curtable, copy 1 used
                                        // entry if there is one in this bucket
            Let entryix = cleanix modulo bucketsize
                                        // offset of cleanix in this bucket
            While (entryix is not past the end of this bucket, i.e., within bucketsize)
                If (isused(entry at alttable bucket, offset entryix))
                                        // found a key in alttable
                    Let cleanix = cleanix + 1
                                        // for next time
                    copyput(key at alttable bucket, offset entryix)
                                        // do NOT delete key from alttable
                    break out of While loop
                Let cleanix = cleanix + 1  // Look further
                Let entryix = entryix + 1
        Else                            // clean phase, clean entire bucket
            Set all bucketsize entries within bucket to empty
            Let cleanix = cleanix + bucketsize
copyput(key)                            // helper for TableReorganization that only
                                        // copies from alttable into curtable
                                        // Key being copied will not be in both tables,
                                        // because only copyput can cause it to be
                                        // in both tables, so just copy from alttable to
                                        // curtable.
        return(find(key,curtable,false,true))
```

It is to be understood that the embodiments and variations shown and described herein are merely illustrative of the principles of this invention and that various modifications may be implemented by those skilled in the art without departing from the scope and spirit of the invention. For instance, the table reorganizer process can be made to run in the background, such that the table reorganizer process is not called from Get, Put or Remove. Although the multithreading description above describes multiple processors, aspects of the present invention are also applicable to multithreading on a single processor.

What is claimed is:

1. A method for use in a processor for reorganizing a hash table, the method comprising the steps of:
   copying used entries from a first hash table to a second hash table during a copy phase, wherein during the copy phase one or more of the first and second hash tables are accessed in conjunction with a hash table operation; and
   cleaning the first hash table during a clean phase, wherein during the clean phase only the second hash table is accessed in conjunction with a hash table operation.

2. The method of claim 1, wherein a used entry is an entry that has not expired and that is not marked as deleted or empty.

3. The method of claim 1, wherein each entry in the first and second hash tables comprises a bucket.

4. The method of claim 1, wherein the first and second hash tables are switched after all entries have been cleaned in the first hash table, whereby the first hash table is made the second hash table and the second hash table is made the first hash table.

5. The method of claim 1, wherein both of the first and second hash tables are accessed during a hash table operation when the copy phase is occurring.

6. The method of claim 1, wherein only the second hash table is accessed during a hash table operation when the copy phase is occurring.

7. The method of claim 1, wherein only the second hash table receives new entries during a hash table operation when the copy phase is occurring.

8. The method of claim 1, wherein a hash table operation comprises one or more of the steps of deleting an entry in a hash table, finding an entry in a hash table, and adding an entry into a hash table.

9. The method of claim 8, wherein a hash table operation uses a key when performing one or more of deleting an entry in a hash table, finding an entry in a hash table, and adding an entry into a hash table.

10. The method of claim 1, wherein the step of cleaning further comprises the step of marking one or more entries in the first hash table as empty.

11. The method of claim 1, wherein each hash table operation causes one of the steps of copying or cleaning to be performed.

12. The method of claim 1, wherein one of the steps of copying or cleaning is performed after a predetermined number of hash table operations.

13. The method of claim 1, wherein, for a hash table operation, one of the steps of copying or cleaning is performed when a number of hash table probes is less than a threshold.

14. The method of claim 13, further comprising the steps of determining a minimum number of hash table probes for hash table operations during a time period and adjusting the threshold based on a minimum number of hash table probes.

15. The method of claim 1, wherein the hash table operation comprises one or more the steps of finding an entry in a hash table and adding an entry into a hash table, and wherein the step of copying further comprises the step of treating as deleted one or more entries in the first hash table when the one or more entries have not been accessed in a predetermined time period, whereby entries treated as deleted are not copied from the first hash table to the second hash table.

16. The method of claim 1, further comprising the steps of:
   executing a plurality of threads, each of the threads adapted to request one or more hash table operations;
   determining whether a change to a selected one of the first or second hash tables is safe to perform; and
   causing threads requesting the change to wait to perform the change until it has been determined that the change to the selected hash table is safe to perform.

17. The method of claim 16, wherein the change comprises one or more of inserting an entry into the selected hash table, deleting an entry from the selected hash table, and marking an entry as empty in the selected hash table.

18. The method of claim 16, wherein the step of determining whether a change to a selected one of the first or second hash tables is safe to perform further comprises the step of determining how many threads have indicated that the change is to be performed and determining when all threads that have indicated the change is to be performed have performed the change.

19. The method of claim 1, wherein:
   the first hash table is an alternate hash table;
   the second hash table is a current hash table;
   the method further comprises the step of determining a phase from one of the clean phase and the copy phase of hash table reorganization;
   the step of copying occurs only during the copy phase and the step of copying further comprises the steps of:
   copying used entries from the alternate hash table to the current hash table; and
   allowing hash table operations to access both the current hash table and the alternate hash table but allowing new insertions only to occur in the current hash table; and
   the step of cleaning occurs only during the clean phase and the step of cleaning further comprises the steps of:
   cleaning the alternate hash table by marking each entry as empty; and
   restricting hash table accesses to only the current hash table; and
   the method further comprises the steps of switching the current hash table and the alternate hash table when the clean phase is complete, switching phases from the copy phase to the clean phase when the copy phase is complete, and switching phases from the clean phase to the copy phase when the clean phase is complete.

20. An apparatus comprising:
   one or more memories comprising first and second hash tables;
   one or more processors operatively coupled to the one or more memories, the one or more processors configured to:

copy used entries from the first hash table to the second hash table during a copy phase, wherein during the copy phase one or more of the first and second hash tables are accessed in conjunction with a hash table operation; and clean the first hash table during a clean phase, wherein during the clean phase only the second hash table is accessed in conjunction with a hash table operation.

21. An article of manufacture for use in a processor for reorganizing a hash table, comprising:

a machine-readable medium having machine-readable code means embodied thereon, the machine-readable program code means comprising:

a step to copy used entries from a first hash table to a second hash table during a copy phase, wherein during the copy phase one or more of the first and second hash tables are accessed in conjunction with a hash table operation; and a step to clean the first hash table during a clean phase, wherein during the clean phase only the second hash table is accessed in conjunction with a hash table operation.

22. An integrated circuit comprising:

one or more processors operatively coupled to an associated memory comprising first and second hash tables, the one or more processors configured to:

copy used entries from the first hash table to the second hash table during a copy phase, wherein during the copy phase one or more of the first and second hash tables are accessed in conjunction with a hash table operation; and clean the first hash table during a clean phase, wherein during the clean phase only the second hash table is accessed in conjunction with a hash table operation.

23. The integrated circuit of claim 22, wherein the associated memory is external to the integrated circuit.

24. The integrated circuit of claim 22, wherein the associated memory is internal to the integrated circuit.

* * * * *